United States Patent [19]

Takagi

[11] 3,961,373
[45] June 1, 1976

[54] TRACK INDICATING MECHANISM FOR MAGNETIC TAPE RECORDING AND REPRODUCING DEVICE

[75] Inventor: Susumu Takagi, Iwaki, Japan

[73] Assignee: Alps Motorola, Inc., Tokyo, Japan

[22] Filed: Dec. 4, 1974

[21] Appl. No.: 529,483

[30] Foreign Application Priority Data

Dec. 27, 1973  Japan ........................... 49-4914

[52] U.S. Cl. ............................ 360/106; 116/124 D
[51] Int. Cl.² ........................................ G11B 21/08
[58] Field of Search ................. 360/106, 90, 75, 78, 360/77, 109, 130, 128, 137, 104; 116/124 D, DIG. 14; 74/567, 568 R, DIG. 4, 53–55

[56] References Cited
UNITED STATES PATENTS

| | | | |
|---|---|---|---|
| 3,477,725 | 11/1969 | Housman | 360/106 |
| 3,544,114 | 12/1970 | Malone | 360/106 |
| 3,647,986 | 3/1972 | Lace et al. | 360/106 |
| 3,827,082 | 6/1974 | Ban | 360/106 |

*Primary Examiner*—Alfred H. Eddleman
*Attorney, Agent, or Firm*—James W. Gillman; Donald J. Lisa

[57] ABSTRACT

A magnetic tape player for playing multi-track tapes includes a head positioning cam movable in accordance with the track changing operation of the player. An indicator lever arm has a cam follower abutting the cam and is pivoted to different positions by rotation of the cam. The lever arm is connected by a flexible cord to a track indicator body urged in one direction by means of a spring, so that the track indicating body is moved to different positions indicative of the selected track as the lever arm is moved by the head positioning cam.

5 Claims, 5 Drawing Figures

TRACK INDICATING MECHANISM FOR MAGNETIC TAPE RECORDING AND REPRODUCING DEVICE

BACKGROUND OF THE INVENTION

This invention relates generally to magnetic tape players or recording and reproducing devices, and more particularly to a track indicating mechanism to be used in such tape players and recording and reproducing devices having eight tracks.

Ordinarily, the magnetic tape recording and reproducing devices of a cartridge type and having eight tracks are equipped in the dashboard or in the neighborhood of an automobile or automotive vehicle, so that the compactness of the devices, reliability of operation, and an aesthetically pleasant appearance are desired.

SUMMARY OF THE INVENTION

An object of the present invention is to provide a track indicating mechanism for the cartridge type tape recording and reproducing devices, which can afford an ample variety in design and arrangement within the tape recording and reproducing devices.

An additional object of this invention is to provide a track indicating mechanism operated by the head positioning cam of a multi-track tape player, where the indicator portion may be remotely located from the cam.

The above described and other objects of the present invention can be achieved by an improved track indicating mechanism for a magnetic tape recording and reproducing device including a cam member moved in correspondence with the track changing operation of the magnetic tape recording and reproducing device. An indicator lever arm abuts with the cam member and is arranged for pivotal movement at one end. A rotatable track indicating body is urged in one direction by a spring, and a linking member connects the other end of the indicator lever arm to the track indicating body. This causes the lever arm to be resiliently urged against the cam member, so that rotation of the cam member of a track changing operation of the magnetic tape recording and reproducing device causes the track indicating body to move to a position indicating the track thus selected.

In a preferred embodiment of the invention, the inter-linking member is made of a thread or a wire, thus permitting the track indicating body and associated parts to be arranged at any desired position.

The nature, principle, and utility of the present invention will be more clearly understood from the following detailed description of the invention when read in conjunction with the accompanying drawings wherein like parts are designated by like reference numerals.

DETAILED DESCRIPTION OF THE INVENTION

Figure 1:
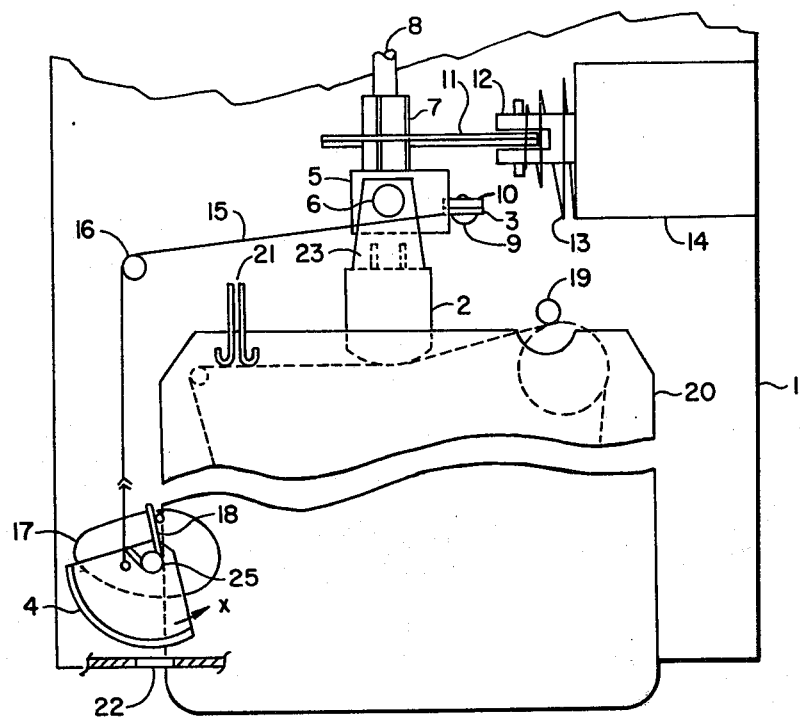
FIG. 1 is a plan view of a cartridge type tape recording and reproducing device including a track indicating mechanism according to a preferred embodiment of the present invention.
Figure 2:
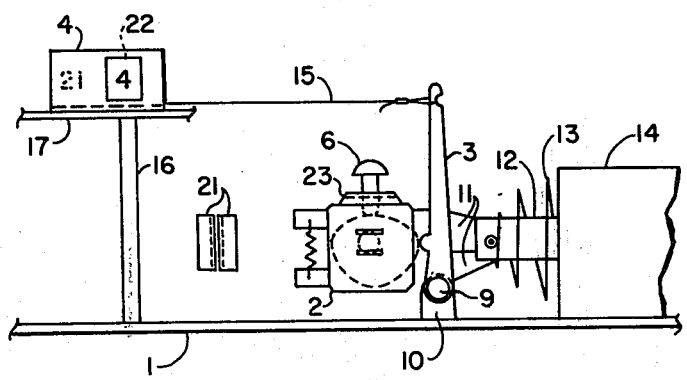
FIG. 2 is an elevational view of a part of the tape recording and reproducing device shown in FIG. 1.

Referring now to FIGS. 1 and 2, the magnetic tape recording and reproducing device includes a casing 1 within which is provided a magnetic head 2 secured to a supporting plate 23 permitting the magnetic head to move upward and downward in a predetermined extent. In the casing 1, there are also provided a cam member 5 fixedly mounted on a shaft 8 rotatably supported in the casing, a machine screw 6 bears on the cam member and is screw-engaged in the supporting plate 23 for adjusting the height of the magnetic head. A spring or the like (not shown) urges the supporting plate 23 downwardly to cause the end of the machine screw 6 to abut against the outer surface of the cam member 5. Thus, the screw 6 acts as a cam follower to adjust the position of the head 2 as determined by the rotational position of the cam member 5.

A solenoid 14 including a plunger 12 for reciprocating therein is fixedly mounted on the casing 1, and one end of the plunger 12 is connected with a pawl 11 which engages a ratchet wheel 7 fixedly mounted on the shaft 8. When the pawl 11 is withdrawn and released under the action of the plunger 12, the cam member 5 is rotated by an angle corresponding to a tooth of the ratchet wheel 7. A spring 13 is provided to retract the plunger 12 when the solenoid 14 is not energized.

An indicator lever arm 3 has a projecting cam follower portion 24 abutting the peripheral surface of the cam member 5 and is pivoted at an end thereof on a pivot pin 9 supported on a lug 10 rising upwardly from the casing 1. A track indicating body 4 is fixed to a pin 25 which is rotatably supported on a supporting plate 17 attached in a suitable manner to the casing 1, and the track indicating body 4 is always urged in the "X" direction as viewed in FIG. 1 by means of a spring 18. An interlinking member 15, such as a thread or wire cord, has one end connected to the indicator arm 3 and the other end connected to the track indicating body 4, and is extended around a post 16 and kept in tension under the action of the spring 18, thus causing the indicator arm 3 constantly to abut against the surface of the cam 5. The player includes the conventional capstan shaft 19 and track changing switch 21. A cartridge 20 is shown in playing position and a track indicating window 22 is provided for viewing a portion of the track indicating body 4.

The operation of the track changing mechanism will now be described. When the track changing contact switch 21 is closed by the sensing foil of the magnetic tape (or when the contact switch is closed by manipulating a track changing button not shown), the solenoid 14 is operated to attract the plunger 12 thereby retracting the pawl 11. The retraction of the pawl 11 causes the ratchet wheel 7 to rotate for one pitch, and the cam member 5 fixed to the shaft 8 of the ratchet wheel 7 is thereby rotated for the same angle. When the cam member 5 is thus rotated, the head supporting plate 23, which is so arranged as to follow the surface of the cam member 5, is moved upward or downward, and the magnetic head 2 supported on the plate 23 is also moved to change the track. Simultaneously therewith, the indicator arm 3 having the projection 24 abutting the peripheral surface of the cam member 5 is rotated around the pivot pin 9, thereby rotating the track indicating body 4 around the pivot pin 25 through the interlinking member 15. In other words, the rotation of the cam member 5 changes the height or track of the magnetic head 2, and also rotates the indicating body 4 for indicating a figure representing the track through the window 22.

Figure 3:
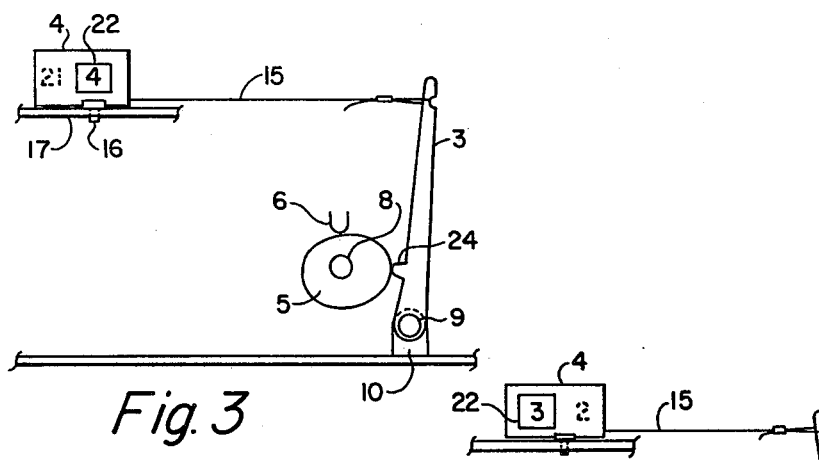
FIGS. 3 and 4 are simplified elevational views of the device shown in FIG. 1 for showing different operational states of the track indicating mechanism.
Figure 4:
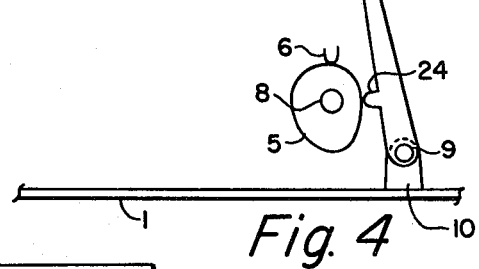

In FIGS. 3 and 4, there are indicated different relative positions between the indicator arm 3 and the track indicating body 4, both operated under the rotation of the cam member 5. More specifically, in FIG. 3, the relative positions of the indicator lever arm 3 and the track indicating body 4 are shown when the magnetic head 2 is on the fourth track; and in FIG. 4, the relative positions of the same arm 3 and the same indicating body 4 are shown when the magnetic head 2 is on the third track.

Figure 5:
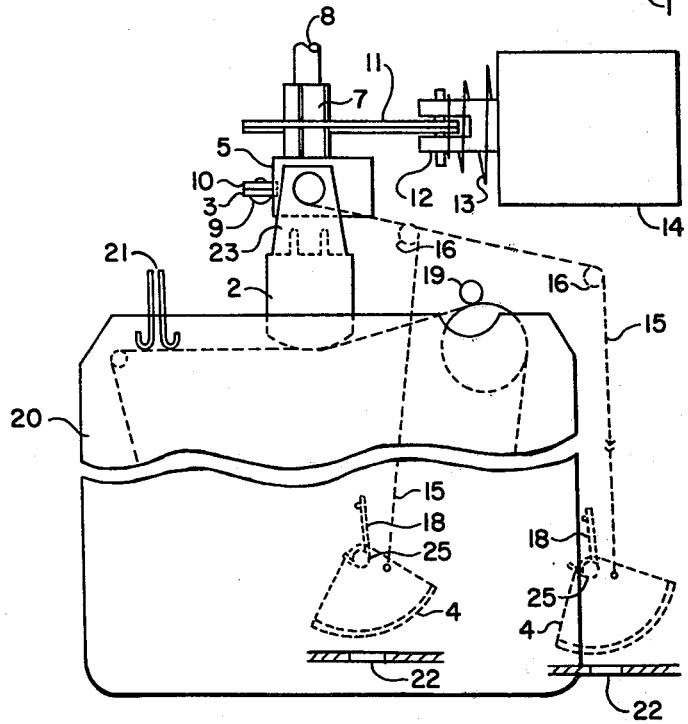
FIG. 5 is a plan view of a cartridge type tape recording and reproducing device including a track indicating mechanism, illustrating the manner in which the track indicating body may be arranged at different two positions.

In FIG. 5, there is shown another example of a cartridge type tape recording and reproducing device including a track indicating mechanism according to the present invention, wherein the indicator arm 3, track indicating body 4, and the guiding post 16 are arranged at other positions different from those indicated in FIGS. 1 and 2.

As is apparent from the above description, the indicator lever arm 3 and the track indicating body 4 are connected together through an interlinking member such as a thread or wire; so that the track indicating body 4 can be arranged at any desired position in accordance with the design and construction of the track indicating mechanism. Thus, the production cost of the track indicating mechanism is thereby substantially economized.

I claim:

1. A track indicating mechanism for a multi-track magnetic tape recording and/or reproducing device including in combination: a frame member; a cam member mounted for rotation in said frame member and movable in accordance with a track changing operation of the magnetic tape device; an indicator lever arm having a cam follower portion abutting said cam member and pivotally mounted at one end on said frame member; a spring; track indicating means urged in a predetermined direction by said spring; and linking means connecting the other end of said indicator lever arm to said track indicating means for constantly resiliently urging said cam follower portion of said indicator lever arm against said cam member through the forces applied by said spring to said track indicating means, so that said indicator lever arm moves said track indicating means to predetermined positions corresponding to predetermined rotational positions of said cam member.

2. A track indicating mechanism according to claim 1 wherein said cam member is fixedly mounted on a rotatable shaft and further is used for positioning a magnetic head in said recording and reproducing device, said mechanism further including means for rotating said shaft.

3. A track indicating mechanism according to claim 1 wherein said track indicating means comprises a pivotally mounted indicator body having indicia thereon representative of different tracks, said body biased by said spring to a predetermined position and moved to other predetermined positions under the control of said indicator lever arm operating thereon through said linking means to pivot said track indicating body to such different positions.

4. The combination according to claim 2 wherein said linking means comprises an elongated flexible cord and said mechanism further includes at least one guide member attached to said frame for guiding said elongated flexible cord over a predetermined path between said other end of said indicator lever arm and said track indicating body.

5. The combination according to claim 4 wherein said guide member comprises a guide post and said track indicating body may be located at a position remote from the location of said cam member.

* * * * *